United States Patent [19]
Heinrich et al.

[11] Patent Number: 5,950,360
[45] Date of Patent: *Sep. 14, 1999

[54] USE OF GEL FORMULATIONS AS DRESSING AGENTS FOR PLANT SEED

[75] Inventors: Gunter Heinrich, Leverkusen; Erhard Weber, Wuppertal; Manfred Zimmermann, Monheim, all of Germany

[73] Assignee: Bayer Aktiengesellschaft, Leverkusen, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/737,190
[22] PCT Filed: May 8, 1995
[86] PCT No.: PCT/EP95/01734
 § 371 Date: Nov. 7, 1996
 § 102(e) Date: Nov. 7, 1996
[87] PCT Pub. No.: WO95/31889
 PCT Pub. Date: Nov. 30, 1995

[30] Foreign Application Priority Data

May 19, 1994 [DE] Germany ............... 44 17 555

[51] Int. Cl.$^6$ ............ A01B 79/00; A01C 1/06; C05F 11/08; A01N 25/00
[52] U.S. Cl. ............... 47/58.1; 47/57.6; 71/6; 71/7; 71/64.09; 800/298
[58] Field of Search .............. 47/58.1, 57.6; 71/6, 7, 64.09; 800/298

[56] References Cited

U.S. PATENT DOCUMENTS 4,161,397   7/1979   Bellet et al. .................. 71/7

FOREIGN PATENT DOCUMENTS

85/02972   7/1985   WIPO .

*Primary Examiner*—Robert A. Wax
*Assistant Examiner*—Tekchand Saidha
*Attorney, Agent, or Firm*—Sprung Kramer Schaefer & Briscoe

[57] ABSTRACT

Disclosed are gel formulations, which are useful for dressing plant seed. The gel formulations comprise at least one active compound, at least one gel-forming agent, water, and an additive.

5 Claims, No Drawings

USE OF GEL FORMULATIONS AS DRESSING AGENTS FOR PLANT SEED

The present invention relates to the use of water-containing gel formulations for dressing seed.

It has already been disclosed to dress seed with dry pulverulent formulations of pesticidal active compounds in customary mixers. However, a disadvantage of this method is that such powders adhere only poorly to the surface of the seed and therefore some of the active compound is lost by abrasion. It is also a disadvantage that seed dressed with dry powders dusts during use and this causes trouble to or even endangers the user.

It is furthermore known to dress seed by mixing powder formulations with water and stirring the slurry dressings thus formed with the seed in suitable apparatuses. What is detrimental about this method of seed treatment is that the mixture must be kept homogeneous by constant stirring, because otherwise incorrect dosages which jeopardise the success of the dressing easily occur. It is furthermore a disadvantage that as a result of the addition of water, the moisture content of the seed increases, which means that the storage stability is reduced in some cases. Finally, slurry dressings are prone to dusting off from the surface of the seed during long mixing times, so that a loss in active compound may occur, as in the case of dry dressing.

It is furthermore known to employ dressings of pesticidal active compounds in the form of solutions, emulsions or suspensions. However, these methods of seed treatment are also not always satisfactory. Thus, moist dressings often comprise organic solvents, which may pollute the environment or may impair the seed tolerance of the dressings. Emulsion dressings and suspension dressings must be further diluted by addition of water before use, so that an adequately uniform distribution of the active compounds on the seed is achieved. This is a disadvantage above all if batch mixers are used and in the case of yard dressing, because the moisture content of the seed is greatly increased by the high water content and the storage stability of the seed is therefore limited to a considerable extent.

A process for seed dressing is furthermore known which comprises first mixing the seed with an aqueous formulation which comprises at least one pyrethroid and at least one binder, and then treating it with at least one pulverulent fungicide (cf. DE-OS (German Published Specification) 4 220 931). This dressing method produces good results, but is relatively complicated since the seed treatment is carried out in two steps.

Pesticide formulations in gel form and their use for the preparation of aqueous spray liquors have furthermore already been described (cf. EP Published Specification 0 449 773 and EP Published Specification 0 518 689). However, a use of gels for dressing seed is not mentioned.

It has now been found that gel formulations which comprise at least one active compound suitable for dressing seed,
at least one gel-forming agent,
water and
additives can be used for dressing seed.

It is to be described as extremely surprising that the gel formulations according to the invention can be employed for dressing seed. In particular, on the basis of the prior art already known, it was to be assumed that gels cannot be applied to seed sufficiently uniformly and with sufficient abrasion resistance. In contrast to expectations, however, the gels which can be used according to the invention produce a firmly adhering deposit on the grains of the seed, which also withstands mechanical stresses to an adequate degree.

The use according to the invention of gel formulations is distinguished by a number of advantages. Thus, before use of the gels, no further dilution with water is necessary. The moisture content of the seed is thus not noticeably increased and the storage stability of the treated material is retained. Since the gels furthermore are distributed sufficiently uniformly on the surface of the seed and have excellent adhesion, hardly any losses of active compound by abrasion occur. It is also particularly advantageous that the dressings in gel form can be employed in exactly the desired amount in each case, so that incorrect dosages can be avoided. It is furthermore to be mentioned that the dressings in gel form can be used widely. They can be employed without problems both for seed treatment in batch mixers, such as, for example, dressing drums, concrete mixers and similar apparatuses, and in high-speed mixers such as are customary in the fields of industrial mixing or for mixing feeds.

The gel formulations which can be used according to the invention comprise one or more active compounds suitable for dressing seed. Possible active compounds of this kind are all the customary fungicides, insecticides, acaricides, nematicides, plant growth regulators and bird repellents suitable for treatment of seed.

Examples of fungicides which may be mentioned here are:

2-aminobutane; 2-anilino-4-methyl-6-cyclopropyl-pyrimidine; 2',6'-dibromo-2-methyl-4'-trifluoromethoxy-4'-trifluoromethyl-1,3-thiazole-5-carboxamide; 2,6-dichloro-N-(4-trifluoromethylbenzyl)-benzamide; (E)-2-methoximino-N-methyl-2-(2-phenoxyphenyl)-acetamide; 8-hydroxyquinoline sulphate; methyl (E)-2-{2-[6-(2-cyanophenoxy)-pyrimidin-4-yloxy]-phenyl}-3-methoxyacrylate; methyl (E)-methoximino-[alpha-(o-tolyloxy)-o-tolyl]-acetate; 2-phenylphenol (OPP), aldimorph, ampropylfos, anilazin, azaconazole, benalaxyl, benodanil, benomyl, binapacryl, biphenyl, bitertanol, blasticidin-S, bromuconazole, bupirimate, buthiobate, calcium polysulphide, captafol, captan, carbendazim, carboxin, chinomethionat (quinomethionate), chloroneb, chloropicrin, chlorothalonil, chlozolinate, cufraneb, cymoxanil, cyproconazole, cyprofuram, dichlorophen, diclobutrazol, diclofluanid, diclomezin, dicloran, diethofencarb, difenoconazole, dimethirimol, dimethomorph, diniconazole, dinocap, diphenylamine, dipyrithion, ditalimfos, dithianon, dodine, drazoxolon, edifenphos, epoxyconazole, ethirimol, etridiazol, fenarimol, fenbuconazole, fenfuram, fenitropan, fenpiclonil, fenpropidin, fenpropimorph, fentin acetate, fentin hydroxide, ferbam, ferimzone, fluazinam, fludioxonil, fluoromide, fluquinconazole, flusilazole, flusulfamide, flutolanil, flutriafol, folpet, fosetyl-aluminium, fthalide, fuberidazole, furalaxyl, furmecyclox, guazatine, hexachlorobenzene, hexaconazole, hymexazole, imazalil, imibenconazole, iminoctadin, iprobenfos (IBP), iprodion, isoprothiolan, kasugamycin, copper formulations, such as: copper hydroxide, copper naphthenate, copper oxychloride, copper sulphate, copper oxide, oxine-copper and Bordeaux mixture, mancopper, mancozeb, maneb, mepanipyrim, mepronil, metalaxyl, metconazole, methasulfocarb, methfuroxam, metiram, metsulfovax, myclobutanil, nickel dimethyldithiocarbamate, nitrothal-isopropyl, nuarimol, ofurace, oxadixyl, oxamocarb, oxycarboxin, pefurazoat, penconazole, pencycuron, phosdiphen, pimaricin, piperalin, polyoxin, probenazole, prochloraz, procymidon, propamocarb, propiconazole, propineb, pyrazophos, pyrifenox, pyrimethanil, pyroquilon, quintozen (PCNB), sulphur and sulphur formulations, tebuconazole, tecloftalam, tecnazen, tetraconazole, thiabendazole, thicyofen, thiophanat-methyl, thiram, tolclophos-methyl, tolylfluanid, triadimefon, triadimenol, triazoxide, trichlamide, tricyclazole, tridemorph, triflumizole, triforin, triticonazole, validamycin A, vinclozolin, zineb, ziram.

Examples of insecticides, acaricides and nematicides which may be mentioned are:

abamectin, abamectin, AC 303 630, acephat, acrinathrin, alanycarb, aldicarb, alphamethrin, amitraz, avermectin, AZ 60541, azadirachtin, azinphos A, azinphos M, azocyclotin,

*Bacillus thuringiensis*, bendiocarb, benfuracarb, bensultap, betacyluthrin, bifenthrin, BPMC, brofenprox, bromophos A, bufencarb, buprofezin, butocarboxin, butylpyridaben, cadusafos, carbaryl, carbofuran, carbophenothion, carbosulfan, cartap, CGA 157419, CGA 184699, chloethocarb, chlorethoxyfos, chlorfenvinphos, chlorfluazuron, chlormephos, chlorpyrifos, chlorpyrifos M, cis-resmethrin, clocythrin, clofentezin, cyanophos, cycloprothrin, cyfluthrin, cyhalothrin, cyhexatin, cypermethrin, cyromazin, deltamethrin, demeton M, demeton S, demeton-S-methyl, diafenthiuron, diazinon, dichlofenthion, dichlorvos, dicliphos, dicrotophos, diethion, diflubenzuron, dimethoate, dimethylvinphos, dioxathion, disulfoton, edifenphos, emamectin, esfenvalerate, ethiofencarb, ethion, ethofenprox, ethoprophos, etrimphos, fenamiphos, fenazaquin, fenbutatin oxide, fenitrothion, fenobucarb, fenothiocarb, fenoxycarb, fenpropathrin, fenpyrad, fenpyroximate, fenthion, fenvalerate, fipronil, fluazinam, flucycloxuron, flucythrinate, flufenoxuron, flufenprox, fluvalinate, fonophos, formothion, fosthiazate, fubfenprox, furathiocarb, HCH, heptenophos, hexaflumuron, hexythiazox, imidacloprid, iprobenfos, isazophos, isofenphos, isoprocarb, isoxathion, ivemectin, lamda-cyhalothrin, lufenuron, malathion, mecarbam, mervinphos, mesulfenphos, metaldehyde, methacrifos, methamidophos, methidathion, methiocarb, methomyl, metolcarb, milbemectin, monocrotophos, moxidectin, naled, NC 184, NI 25, nitenpyram omethoate, oxamyl, oxydemethon M, oxydeprofos, parathion A, parathion M, permethrin, phenthoate, phorate, phosalon, phosmet, phosphamdon, phoxim, pirimicarb, pirimiphos M, pirimiphos A, profenofos, promecarb, propaphos, propoxur, prothiofos, prothoate, pymetrozin, pyrachlophos, pyradaphenthion, pyresmethrin, pyrethrum, pyridaben, pyrimidifen, pyriproxifen, quinalphos,

RH 5992, salithion, sebufos, silafluofen, sulfotep, sulprofos, tebufenozid, tebufenpyrad, tebupirimphos, teflubenzuron, tefluthrin, temephos, terbam, terbufos, tetrachlorvinphos, thiafenox, thiodicarb, thiofanox, thiomethon, thionazin, thuringiensin, tralomethrin, triarathen, triazophos, triazuron, trichlorfon, triflumuron, trimethacarb, vamidothion, XMC, xylylcarb, zetamethrin.

Chlormequat may be mentioned as examples of a plant growth regulator in the present connection.

Examples of bird repellents which the gel formulations which can be used according to the invention can comprise are anthraquinone and methiocarb.

The gel formulations which can be used according to the invention comprise one or more gel-forming agents. Possible gel-forming agents here are all the customary substances which are tolerated by seed and are suitable for the preparation of gels. Substances which can preferably be used are organic polymers, such as agar, alginates, alkyl- and hydroxyalkylcellulose, carragheenan, carboxymethylcellulose, gelatin, guar gum, gum arabic, ghatti gum, karaya gum, tragacanth gum, hydroxyethylcellulose, hydroxypropylcellulose, locust bean gum (carob bean flour), pectins, polyacrylamides, polyacrylic acid and its salts, polyethylene glycols, polyvinyl alcohols, polyvinylpyrrolidones and copolymers thereof with polyvinyl acetate, starch and xanthan, and also inorganic gel-forming agents, such as smectites and bentonites.

The gel formulations which can be used according to the invention furthermore comprise water and one or more additives. Possible additives here are all the customary components which can be employed in dressing compositions, such as, for example, dyestuffs, wetting agents, dispersing agents, emulsifiers, antifoams, preservatives, components which delay drying out, antifreezes, secondary thickeners, solvents, salts and acids.

Possible dyestuffs which can be present in the gel formulations which can be used according to the invention are all the dyestuffs customary for such purposes. Both pigments which have a low solubility in water and water-soluble dyestuffs can be used here. As examples mentioned is the dyestuffs known under the names Rhodamin B, C.I. Pigment Red 112 and C.I. Solvent Red 1.

Possible wetting agents which the gel formulations which can be used according to the invention can comprise are all the substances which are customary for the formulation of pesticides and promote wetting. Substances which can preferably be used are alkylnaphthalene-sulphonates, such as diisopropyl- or diisobutyl-naphthalene-sulphonates.

Possible dispersing agents and/or emulsifiers which the gel formulations which can be used according to the invention can comprise are all the nonionic, anionic and cationic dispersing agents customary for the formulation of pesticides. Nonionic or anionic dispersing agents or mixtures of nonionic or anionic dispersing agents can preferably be used. Suitable nonionic dispersing agents which may be mentioned are, in particular, ethylene oxide/propylene oxide block polymers, alkylphenol polyglycol ethers and tristryrylphenol polyglycol ethers and phosphated or sulphated derivatives thereof. Suitable anionic dispersing agents are, in particular, ligninsulphonates, polyarylic acid salts and arylsulphonate-formaldehyde condensates.

Antifoams which the gel formulations which can be used according to the invention can comprise are all the foam-inhibiting substances customary for the formulation of pesticides. Silicon antifoams and magnesium stearate can preferably be used.

Preservatives which can be present in the gel formulations which can be used according to the invention are all the substances which can be employed for such purposes in pesticidal compositions. Examples which may be mentioned are dichlorophen and benzyl alcohol hemiformal.

Possible components which delay drying out and antifreezes which the gel formulations which can be used according to the invention can comprise are all the substances which can be employed for such purposes in pesticidal compositions. Substances which are preferably possible are polyhydric alcohols, such as glycerol, ethanediol, propanediol and polyethylene glycols of various molecular weights.

Possible secondary thickeners which the gel formulations which can be used according to the invention can comprise are all the substances which can be employed for such purposes in pesticidal compositions. Substances which are preferably possible are cellulose derivatives, acrylic acid derivatives, xanthan, modified clays and highly disperse silicic acid.

Possible solvents which the gel formulations which can be used according to the invention can comprise are all the organic solvents which can be employed in pesticidal compositions. Preferred possible solvents are ketones, such as methyl isobutyl ketone and cyclohexanone, and furthermore amides, such as dimethylformamide, and moreover cyclic compounds, such as N-methyl-pyrrolidone, N-octyl-pyrrolidone, N-dodecyl-pyrrolidone, N-octyl-caprolactam, N-dodecyl-caprolactam and γ-butyrolactone, and in addition strongly polar solvents, such as dimethyl sulphoxide, and furthermore aromatic hydrocarbons, such as xylene, and also esters, such as propylene glycol monomethyl ether-acetate, dibutyl adipate, hexyl acetate, heptyl acetate, tri-n-butyl citrate, diethyl phthalate and di-n-butyl phthalate, and moreover alcohols, such as ethanol, n- and i-propanol, n- and i-butanol, n- and i-amyl alcohol, benzyl alcohol and 1-methoxy-2-propanol.

Salts which the gel formulations which can be used according to the invention can comprise are all the salts which are usually present in pesticidal compositions or can be employed for the preparation of gels. Preferred possible salts are sodium chloride and borax.

Acids which the gel formulations which can be used according to the invention can comprise are all the inorganic and organic acids which are usually present in pesticidal compositions or can be employed for the preparation of gels. Preferred possible acids are aliphatic and aromatic hydroxy-carboxylic acids, such as citric acid, salicylic acid, tartaric acid and ascorbic acid, as well as inorganic acids, such as dilute hydrochloric acid or dilute sulphuric acid.

The concentrations of the individual components in the gel formulations which can be used according to the invention can be varied within a certain range. In general, the active compound concentrations are between 0.1 and 80% by weight, preferably between 0.5 and 60% by weight. The concentration of gel-forming agents is in general between 0.1 and 10% by weight, preferably between 0.5 and 5% by weight. The concentration of additives is in general between 1 and 30% by weight, preferably between 2 and 28% by weight. The portion of the gel formulations which can be used according to the invention remaining in each case comprises water.

The gel formulations which can be used according to the invention are prepared by customary methods. In general, a procedure is followed in which gel-forming agents are added to aqueous solutions, suspensions or oil-in-water emulsions of active compounds and additives while stirring intensively, if appropriate with the addition of salts and/or acids.

The temperatures can be varied within a certain range during the preparation of the gel formulations which can be used according to the invention. The preparation is in general carried out at temperatures between 10° C. and 80° C., preferably between 20° C. and 70° C.

The viscosities, measured with a Brookfield viscometer at 30 revolutions per minute, of the gel formulations which can be used according to the invention are at least 5,000 cps, preferably above 15,000 cps.

Seed of the most diverse nature can be treated with the gel formulations which can be used according to the invention. Thus, the gel formulations which can be used according to the invention can be employed for dressing seed of cereals, such as wheat, barley, rye, oats and triticale, and the seed of maize, rape, peas, broad beans, cotton, sunflowers and beet, or also vegetable seed of the most diverse nature.

All the mixing apparatuses which can usually be employed for dressing are possible for treatment of seed with the gel formulations which can be used according to the invention. Specifically, a procedure is followed during dressing in which the seed is introduced into a mixer, the particular desired amount of gel formulation which can be used according to the invention is added and the components are mixed until the formulation is uniformly distributed on the seed.

The preparation and the use of the gel formulations which can be used according to the invention can be seen from the following examples.

PREPARATION EXAMPLES

Example 1

A suspension, prepared by wet grinding, of
15.0 g of triadimenol,
2.0 g of the dyestuff with the designation C.I. Solvent Red 1
2.0 g of tri-(methylstyryl)-phenol ethoxylate with on average 29 ethylene oxide units per molecule,
0.1 g of silicone antifoam,
0.1 g of benzyl alcohol hemiformal,
2.0 g of highly disperse silicic acid and
83.0 g of water
is treated at room temperature, while stirring, with
0.5 g of sodium chloride and
1.0 g of iota carragheenan.

The mixture is heated to 60° C., while stirring. The highly liquid suspension formed by this procedure is introduced into a storage vessel, where a gel forms on cooling to room temperature.

Example 2

0.5 g of borax and
0.75 g of guar gum
are added to a suspension, prepared by wet grinding, of the composition given in Example 1 at room temperature, while stirring. The mixture is then homogenized with an Ultraturrax stirrer and introduced into a storage vessel. When left to stand at room temperature, a gel forms.

Example 3

1 g of sodium alginate
is added to a suspension, prepared by wet grinding, of the composition given in Example 1 at room temperature, while stirring. Dilute sulphuric acid is then slowly added at room temperature, while stirring intensively, in an amount such that a pH of 3.5 is reached. The mixture is introduced into a storage vessel, where a gel forms on leaving to stand at room temperature.

Example 4

A suspension, prepared by wet grinding of
15.0 g of triadimenol,
2.0 g of the dyestuff with the designation C.I. Solvent Red 1
2.0 g of tri-(methylstyryl)-phenol ethoxylate with on average 29 ethylene oxide units per molecule,
0.1 g of silicone antifoam,
0.1 g of benzyl alcohol hemiformal,
20.0 g of glycerol,
2.0 g of highly disperse silicic acid and
63.0 g of water
is treated at room temperature, while stirring, with
0.5 g of sodium chloride and
1.0 g of iota carragheenan.

The mixture is heated to 60° C., while stirring. The highly liquid suspension formed by this procedure is introduced into a storage vessel, where a gel forms on cooling to room temperature.

Example 5

A suspension, prepared by wet grinding, of the composition given in Example 4, but which comprises 20.0 g of propane-1,2-diol instead of glycerol, is treated at room temperature, while stirring, with
0.5 g of sodium chloride and
1.0 g of iota carragheenan.

The mixture is heated to 60° C., while stirring. The highly liquid suspension formed by this procedure is introduced into a storage vessel, where a gel forms on cooling to room temperature.

Example 6

A suspension, prepared by wet grinding, of the composition given in Example 4, but which comprises 20.0 g of polyethylene glycol 400 instead of glycerol, is treated at room temperature, while stirring, with
0.5 g of sodium chloride and
1.0 g of iota carragheenan.

The mixture is heated to 60° C., while stirring. The highly liquid suspension formed by this procedure is introduced into a storage vessel, where a gel forms on cooling to room temperature.

Example 7

A suspension, prepared by wet grinding, of
35.0 g of bitertanol,
0.5 g of the dyestuff with the designation C.I. Solvent Red 1,
1.0 g of tristyrylphenol ethoxylate with on average 29 ethylene oxide units per molecule,
0.1 g of silicone antifoam,
20.0 g of polyethylene glycol 400,
0.5 g of sodium chloride,
0.1 g of benzyl alcohol hemiformal and
45.0 g of water
is treated at room temperature, while stirring, with 1.0 g of iota carragheenan. The mixture is heated to 60° C., while stirring. The highly liquid suspension formed by this procedure is introduced into a storage vessel, where a gel forms on cooling to room temperature.

Example 8

A suspension, prepared by wet grinding, of
20.0 g of imidacloprid,
2.0 g of the dyestuff with the designation C.I. Pigment Red 57:1,
1.0 g of tristyrylphenol ethoxylate with on average 54 ethylene oxide units per molecule,
20.0 g of polyethylene glycol 400,
0.5 g of sodium chloride and
67.0 g of water
is treated at room temperature, while stirring, with 10.0 g of a 2% strength aqueous xanthan solution. Thereafter, 1.0 g of iota carragheenan is added at room temperature, while stirring. The mixture is heated to 60° C. The highly liquid suspension formed by this procedure is introduced into a storage vessel, where a gel forms on cooling to room temperature.

Example 9

An emulsion of
3.75 g of cyfluthrin,
0.3 g of Rhodamin B,
6.0 g of diethyl phthalate,
1.13 g of polyvinyl alcohol,
3.0 g of glycerol and
74.3 g of water
is treated at room temperature, while stirring, with
0.3 g of sodium chloride and
1.0 g of iota carragheenan.

The mixture is heated to 60° C., while stirring. The highly liquid-mixture formed by this procedure is introduced into a storage vessel, where a gel forms on cooling to room temperature.

USE EXAMPLES

Example I 500 ml of the gel formulation according to Example 7 are added to 100 kg of wheat in a dressing drum and the components are mixed for 3 minutes. Seed on the surface of which the gel is uniformly distributed is obtained in this manner.

Example II 250 ml of the gel formulation according to Example 8 are added to 100 kg of wheat in a dressing drum and the components are mixed for 3 minutes. Seed on the surface of which the gel is uniformly distributed is obtained in this manner.

Example III 500 ml of the gel formulation according to Example 9 are added to 100 kg of wheat in a dressing drum and the components are mixed for 3 minutes. Seed on the surface of which the gel is uniformly distributed is obtained in this manner.

We claim:

1. A method for dressing seed which comprises distributing on the surface of the seed a gel formulation which has a viscosity of above 15000 Centipoise (cps) and which comprises;

a) at least one active compound for dressing seed;

b) at least one gel-forming agent;

c) water; and d) an additive;

provided the gel formulation also does not comprise bacteria.

2. The method according to claim 1, wherein the gel formulation comprises at least one fungicidally active compound.

3. The method according to claim 1, wherein the gel formulation comprises at lease one insecticidally active compound.

4. The method according to claim 1, wherein the gel formulation comprises at least one organic polymer as the gel-forming agent.

5. The method according to claim 1, wherein the gel formulation comprises carragheenan.

* * * * *